United States Patent Office 3,711,481
Patented Jan. 16, 1973

3,711,481
6-ARYL-IMIDAZO(2,1-a)PHTHALAZINES
Goetz E. Hardtmann, 208 Brooklake Road,
Florham Park, N.J. 07921
No Drawing. Filed Apr. 24, 1970, Ser. No. 31,781
Int. Cl. C04d 51/06
U.S. Cl. 260—250 A
8 Claims

ABSTRACT OF THE DISCLOSURE

The invention discloses compounds which are 6-aryl-imidazo(2,1-a)phthalazines which are useful by reason of exhibiting pharmacological activity in animals, e.g., anti-inflammatory agents. Said 6-aryl-imidazo(2,1-a)phthalazines are prepared by oxidation of the corresponding 6-aryl-5,6-dihydro-imidazo(2,1-a)phthalazines which in turn are prepared by reacting a corresponding 6-unsubstituted-imidazo(2,1-a)phthalazine with an aryl lithium compound or an aryl magnesium halide.

The present invention relates to novel tricyclic compounds, and more particularly to compounds which are 6-aryl-imidazo(2,1-a)phthalazines, and to methods for preparation of said compounds. The invention also relates to pharmaceutical compositions and methods employing said compounds.

The compounds of the invention may be represented by the following Formula I:

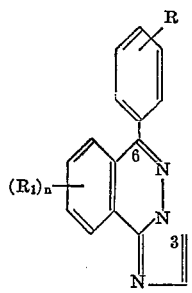

I wherein
R is hydrogen, halo of atomic weight of from 19 to 80, lower alkyl of 1 to 4 carbon atoms, lower alkoxy of 1 to 4 carbon atoms or trifluoromethyl;
$R_1$ is halo of atomic weight of from 19 to 80, lower alkyl of 1 to 5 carbon atoms, preferably 1 to 3 carbon atoms or lower alkoxy of 1 to 5 carbons, preferably 1 to 3 carbon atoms; and
n is 0, 1 or 2, and when 2, then $R_1$ may be the same or different.

The compounds of Formula I are preferably prepared by a Procedure A involving oxidizing a corresponding 6-aryl-5,6-dihydroimidazo(2,1-a)phthalazine of the Formula II:

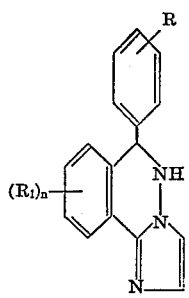

II wherein R, $R_1$ and n are as defined.

The preparation of compounds I by oxidation of a compound II by Procedure A may be conveniently carried out in an inert organic solvent at temperature in the range of from 0° C. to 200° C., typically 100° C. to 160° C. The oxidizing agent employed may be of known type suitable for converting an organic amino moiety to an imino moiety. Representative of such oxidizing agents are manganese dioxide and the alkali metal permanganates such as sodium permanganate and potassium permanganate, preferably manganese dioxide. The organic solvent may be any of the several conventional solvents inert under the reaction conditions and including by way of illustration the aromatic solvents, e.g., toluene and xylene, and the ethers including the cyclic ethers, e.g., dioxane. The reaction product of Formula I may be isolated from the Procedure A reaction by working up by established procedures.

The compounds of Formula II are novel compounds which are preferably prepared in a Step 1 reaction involving subjecting a corresponding imidazo(2,1-a)phthalazine of the Formula III:

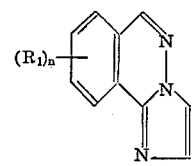

III wherein $R_1$ and n are as defined, to reaction in an organic solvent with an aryl magnesium halide or aryl lithium compound respectively of the Formula IVA or IVB:

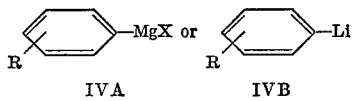

IVA          IVB wherein R is as defined, and X is chloro or bromo, followed by hydrolysis to obtain said compound II.

The preparation of compounds II by the reaction of Step 1 is carried out in an organic solvent medium at controlled temperatures in the range of from minus 40° C. to plus 50° C., preferably 0° C. to 10° C. The reaction may be suitably carried out in any of the several of the well known organic solvents, preferably an organic ether including both the acyclic and cyclic ethers such as diethyl ether, dimethoxyethane, tetrahydrofuran, or dioxane or mixture of such ethers, more preferably a cyclic ether such as tetrahydrofuran. The mole ratio of the aryl magnesium halide or aryl lithium respectively of Formula IVA or IVB to the compound of Formula III is not particularly critical. In the more preferred forms of practice an excess of the magnesium halide or lithium compound is employed, typically to provide a ratio in the range of from about 2:1 to 20:1, more preferably 2:1 to 10:1. The preferred reaction of Step 1 involves a compound of the Formula III with the aryl lithium compound of Formula IVB. The reaction is desirably conducted under anhydrous conditions and followed by controlled alkaline hydrolysis in a known manner to obtain the compound of Formula II which may be isolated, as desired, by working up by established procedures.

The compounds of Formula III are preferably prepared by a Step 2 reaction involving subjecting a 3- alkoxy-2,3-dihydroimidazo(2,1-a)phthalazine of Formula V:

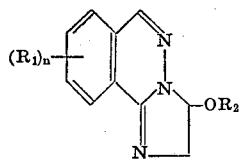

wherein $R_1$ and $n$ are as above-defined and $R_2$ is lower alkyl of 1 to 5 carbon atoms, preferably 1 or 2 carbon atoms, to an elimination reaction in which said compound V is reacted with a strong acid in an organic solvent.

The preparation of compounds III by the elimination reaction of Step 2 is preferably carried out in an inert organic solvent at elevated temperatures which may be suitably in the range of 40° C. to 200° C., more usually 60° C. to 150° C. Representative of the more preferred inert organic solvents are the aromatic solvents such as toluene, benzene and xylene, more usually toluene. Desirably, the compound V is subjected in Step 2 to the action of a strong acid which may be either an inorganic acid such as sulfuric acid or an organic acid such as p-toluene-sulfonic acid, benzene-sulfonic acid or methane-sulfonic acid. In general, an organic acid such as p-toluene-sulfonic acid is preferred because of the better solubility in the reaction mixture. The reaction product of Formula III may be isolated from the reaction mixture of Step 2 by working up by established procedures.

The compounds of Formula V employed as starting material in Step 2 are preferably prepared by a sequence of reactions commencing by subjecting in a Step 3 a known type compound which is a 1-halophthalazine of Formula VI:

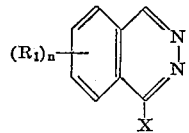

wherein $R_1$, $n$ and X are as above-defined, to reaction with a compound of Formula VII:

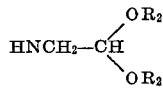

wherein $R_2$ is as above-defined, to obtain an aminoacetaldehyde dialkyl acetal of Formula VIII:

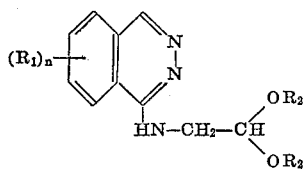

wherein $R_1$, $n$ and $R_2$ are as above-defined, said compound VIII then being cyclized in a Step 4 by heating with an acid to obtain a 3-alkoxy-2,3-dihydroimidazo-(2,1-a)phthalazine of Formula IX:

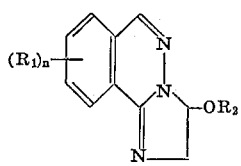

wherein $R_1$, $n$ and $R_2$ are as above-defined.

The preparation of compound VIII by Step 3 involving reaction of a compound VI with a compound VII is a reaction of known type which may be conveniently carried out in an organic solvent medium at temperatures in the range of 40° C. to 200° C., more usually 60° C. to 150° C. Organic solvents providing an inert medium may be employed and include, by way of illustration, the aromatic solvents such as benzene and toluene, the chlorinated hydrocarbons such as methylene chloride and the dialkylamides such as dimethylacetamide. It is however usually convenient and preferred to employ an excess of the compound VII as the solvent medium. The reaction product of Formula VIII of Step 3 may be isolated as desired by working up in a known manner.

The cyclization of a compound VIII in Step 4 to obtain compound IX is preferably carried out in an organic solvent at controlled temperatures in the range of 0° C. to 30° C. The reaction of Step 4 is desirably carried out under anhydrous conditions employing a strong acid which is most conveniently hydrogen chloride or hydrogen bromide, preferably hydrogen chloride. Conventional solvents providing an inert reaction medium are suitably employed with the more convenient solvents being the lower alkanols such as ethanol. The product compound IX may be isolated from the reaction mixture of Step 4 by established procedures.

The compounds VI employed as starting material in Step 3 are either known or may be prepared from available materials by established procedures described in the literature, for example, by A. Hirsch et al., Canadian J. Chem. 43, 2708 (1965).

Compounds of Formula I may form acid addition salts, and may be produced and isolated as such acid addition salts, as desired or required. It will be evident that pharmaceutically acceptable acid addition salts not materially affecting the pharmacological effect of compounds I are also within the scope of the present invention. Such pharmaceutically acceptable salts may include, by way of illustration, the hydrochloride, fumarate, formate, acetate, sulfonate and malonate. The acid addition salts of the subject compound I may be produced from the corresponding free bases by conventional procedures. Conversely, the free bases may be obtained from the salts by procedures known in the art.

The compounds of structural Formula I and their pharmaceutically acceptable acid addition salts are useful because they possess pharmacological activity in animals. In particular, the compounds are useful as anti-inflammatory agents, as indicated by the Carrageenin-induced edema test in rats on oral administration. For the above use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compounds used and the mode of administration. However, in general, satisfactory results are obtained when administered at a daily dosage of from about 4 milligrams to about 150 milligrams per kilogram of body weight, preferably given in divided doses 2 to 4 times a day, or in sustained release form. For most mammals the administration of from about 280 milligrams to about 2000 milligrams of the compound per day provides satisfactory results and dosage forms suitable for internal administration comprise from about 70 milligrams to about 1000 milligrams of the compound in admixture with a solid or liquid pharmaceutical carrier or diluent.

From above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose, and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are sold compositions, particularly hard-filled capsules and tablets.

A representative formulation is a tablet prepared by conventional tabletting techniques and containing the following ingredients:

| Ingredient: | Weight (mg.) |
|---|---|
| 6-phenyl-imidazo[2,1-a]phthalazine | 25 |
| Tragacanth | 10 |
| Lactose | 197.5 |
| Corn starch | 25 |
| Talcum | 15 |
| Magnesium stearate | 2.5 |

The compounds of Formula I also exhibit antibradykinin activity as demonstrated on intravenous administration to the guinea pig, for example, at doses in the range of 4.0 to 5000 micrograms per kilograms of animal body weight.

The following examples show representative compounds encompassed within the scope of this invention and the manner in which such compounds are prepared. However, it is to be understood that the examples are for purposes of illustration only.

EXAMPLE 1

6-phenyl-imidazo(3,1-a)phthalazine

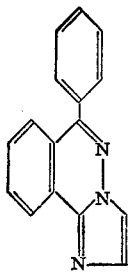

Step A: Preparation of N-(1-phthalazinyl)-aminoacetaldehyde dimethyl acetal

A mixture of 64 g. of 1-chlorophthalazine and 200 g. of aminoacetaldehyde dimethyl acetal is refluxed for one hour. After cooling the reaction mixture is diluted with a large amount of ice water and the resulting partially crystalline precipitate is taken up in ethyl acetate. The aqueous phase is extracted with ethyl acetate and the combined organic phases are washed with water, dried over sodium sulfate and evaporated to dryness in vacuo. The residue is crystallized from ethylacetate to obtain N-(1-phthalazinyl)-aminoacetaldehyde dimethyl acetal, M.P. 145–148°.

Step B: Preparation of 2,3-dihydro-3-methoxy-imidazo(2,1-a)phthalazine

A solution of 43 g. N-(1-phthalazinyl)-aminoacetaldehyde dimethyl acetal in 850 ml. absolute ethanol is cooled in an ice bath and anhydrous hydrogen chloride is introduced into the mixture for 30 min. The mixture is stirred at room temperature overnight, and then most of the solvent is evaporated in vacuo. The residue is treated with 2 N sodium hydroxide solution, extracted with methylene chloride, the organic phase washed with water evaporated in vacuo to obtain a residue which is crystallized from petroleum ether (containing a small amount of diethyl ether) to obtain 2,3-dihydro-3-methoxy-imidazo(2,1-a) phthalazine, M.P. 99–101° C.

Step C: Preparation of imidazo(2,1-a)phthalazine

A mixture of 10.5 g. of 2,3-dihydro-3-methoxy-imidazo(2,1-a)phthalazine and 900 mg. of p-toluene-sulfonic acid in 150 ml. toluene is refluxed for 16 hours. The solvent is evaporated in vacuo, the residue dissolved in methylene chloride, and the solution extracted first with 2 N sodium hydroxide solution and then with water. The organic phase is dried over sodium sulfate and evaporated in vacuo. The resulting residue is redissolved in methanol, treated with charcoal, filtered, concentrated and treated by addition of diethyl ether to crystallize imidazo(2,1-a) phthalazine, M.P. 102–105°. The material sublimes at 85° C. in high vacuum.

Step D: Preparation of 6-phenyl-5,6-dihydro-imidazo (2,1-a)phthalazine

To a solution of 43 g. of imidazo(2,1-a)phthalazine in 2000 ml. of diethyl ether is added over a period of 20 minutes about 410 ml. of a 2.1 N solution of phenyl lithium in hexane while maintaining a temperature of 0–5° C. The resulting mixture is allowed to stand at 0–5° C. for 90 minutes and then 700 ml. of water is added slowly while maintaining ice cooling. The phases are separated and the aqueous phase extracted with diethyl ether. The organic phases are then combined, extracted with water, dried and evaporated in vacuo. The residue is dissolved in acetone, insoluble material removed by filtration and the filtrate evaporated to crystallize 6-phenyl-5,6-dihydro-imidazo(2,1-a)phthalazine, M.P. 147–150° C.

Step F: Preparation of 6-phenyl-imidazo(2,1-a)phthalazine

A mixture of 15 g. of 6-phenyl-5,6-dihydro-imidazo-(2,1-a)phthalazine, 15 g. of manganese dioxide and 300 ml. of xylene is refluxed for 20 hours. The resulting mixture is cooled, filtered and the filtrate evaporated in vacuo. The residue is taken up with ethyl acetate and crystallized therefrom to obtain 6-phenyl-imidazo(2,1-a) phthalazine, M.P. 166–168° C.

EXAMPLE 1a

Step A of Example 1 is repeated replacing aminoacetaldehyde dimethyl acetal with aminoacetaldehyde diethyl acetal to obtain on crystallization from ethyl acetate the compound which is N-(phthalazinyl)-aminoacetaldehyde diethyl acetal, M.P. 119–122° C. The latter compound may be employed in repeating Step B of Example 1 to obtain from diethyl ether/petroleum ether (1:1) the compound which is 2,3-dihydro-3-ethoxy-imidazo(2,1-a)phthalazine, M.P. 68–69° C.

EXAMPLE 2

Following the basic procedure of Example 1, the following compounds of the invention are prepared:

(A) 6-(p-chlorophenyl)-imidazo(2,1-a)phthalazine.
(B) 6-(p-methoxyphenyl)-imidazo(2,1-a)phthalazine.
(C) 6-(m-trifluoromethylphenyl)-imidazo(2,1-a) phthalazine.
(D) 6-(p-methylphenyl)-imidazo(2,1-a)phthalazine.
(E) 9-chloro-6-phenyl-imidazo(2,1-a)phthalazine.
(F) 8,9-dimethoxy-6-phenyl-imidazo(2,1-a)phthalazine.
(G) 9-methyl-6-phenyl-imidazo(2,1-a)phthalazine.

What is claimed is:
1. A compound of the formula:

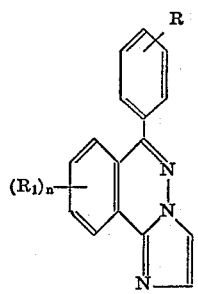

wherein

R is hydrogen, halo of atomic weight of from 19 to 80, lower alkyl, lower alkoxy or trifluoromethyl;

$R_1$ is a halo of atomic weight of from 19 to 80, lower alkyl or lower alkoxy; and n is 0, 1 or 2, and when 2, then $R_1$ may be the same or different;

or a pharmaceutically acceptable acid addition salt thereof.

2. A compound of claim 1 in which n is 0.
3. A compound of claim 1 in which R is hydrogen.
4. The compound of claim 3 in which n is 0.
5. A compound of the formula:

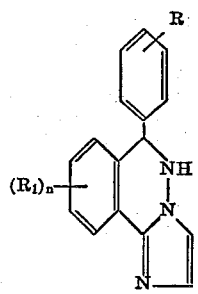

wherein R, $R_1$ and n are as defined in claim 1.
6. A compound of claim 5 in which n is 0.
7. A compound of claim 5 in which R is hydrogen.
8. The compound of claim 7 in which n is 0.

References Cited

Castle et al., J. Hetero Chem., vol. 3, pp. 381–383 (1966).

NICHOLAS S. RIZZO, Primary Examiner

U.S. Cl. X.R.

424—250